(12) United States Patent
Dickson et al.

(10) Patent No.: US 8,574,483 B2
(45) Date of Patent: Nov. 5, 2013

(54) METHOD OF DEFORMING A MICROCELLULAR POLYURETHANE COMPONENT

(75) Inventors: Daniel G. Dickson, West Bloomfield, MI (US); Gary M. Lawrence, Livonia, MI (US)

(73) Assignee: BASF Corporation, Florham Park, NJ (US)

( * ) Notice: Subject to any disclaimer, the term of this patent is extended or adjusted under 35 U.S.C. 154(b) by 1198 days.

(21) Appl. No.: 11/457,835

(22) Filed: Jul. 17, 2006

(65) Prior Publication Data
US 2008/0012178 A1  Jan. 17, 2008

(51) Int. Cl.
*B29C 67/20*  (2006.01)

(52) U.S. Cl.
USPC ........ 264/321; 264/45.1; 264/46.1; 264/46.2; 264/628; 264/663; 264/664; 264/77; 264/241; 264/255; 264/297.4

(58) Field of Classification Search
USPC ......... 264/321, 239, 241, 255, 322, 325, 502, 264/250, 252, 266, 275, 277, 279.1, 282, 264/294, 296, 303, 313, 320, 45.1, 46.1, 264/46.2, 628, 663, 664, 77, 297.4; 425/543
See application file for complete search history.

(56) References Cited

U.S. PATENT DOCUMENTS

| | | | |
|---|---|---|---|
| 3,012,283 A | * | 12/1961 | Foster .............................. 264/54 |
| 3,082,998 A | | 3/1963 | Lange |
| 3,455,546 A | | 7/1969 | Shanok et al. |
| 3,950,483 A | | 4/1976 | Spier |
| 4,080,416 A | | 3/1978 | Howard |
| 4,260,575 A | | 4/1981 | Thew et al. |
| 4,447,486 A | | 5/1984 | Hoppe et al. |
| 4,508,774 A | | 4/1985 | Grabhoefer et al. |
| 4,568,067 A | | 2/1986 | Iwata |

(Continued)

FOREIGN PATENT DOCUMENTS

| | | |
|---|---|---|
| EP | 0 778 166 B1 | 11/2001 |
| GB | 1132954 B | 11/1968 |

(Continued)

OTHER PUBLICATIONS

U.S. Appl. No. 11/457,882, filed Jul. 17, 2006, Dickson, 25 pages.

(Continued)

*Primary Examiner* — Jeffrey Wollschlager
*Assistant Examiner* — Stella Yi
(74) *Attorney, Agent, or Firm* — Howard & Howard Attorneys PLLC

(57) ABSTRACT

A method of deforming a component includes the step of forming the component from thermosetting, elastomeric microcellular polyurethane. The method further includes the step of heating at least a first portion of the component to a first temperature. The method further includes the step of compressing the first portion of the component while maintaining the first portion at the first temperature and while maintaining the second portion of the component at an undeformable state. The method of deforming the component shapes the first portion of the component. Preferably the method shapes the first portion of the component into a thin and/or complexly shape. The method of deforming the component also increases the first portion of the component relative to the second portion of the component, i.e. to densifying the component such that the component has varying density.

24 Claims, 3 Drawing Sheets

(56) References Cited

U.S. PATENT DOCUMENTS

| | | | |
|---|---|---|---|
| 4,711,463 A | 12/1987 | Knable et al. | |
| 4,741,951 A | 5/1988 | Ricciardi et al. | |
| 4,756,516 A | 7/1988 | Tondato | |
| 4,805,886 A | 2/1989 | Hassan | |
| 5,010,133 A * | 4/1991 | Seville | 524/871 |
| 5,052,665 A | 10/1991 | Sakuragi | |
| 5,308,104 A | 5/1994 | Charles | |
| 5,419,539 A | 5/1995 | Bressler | |
| 5,421,565 A | 6/1995 | Harkrader et al. | |
| 5,467,970 A | 11/1995 | Ratu et al. | |
| 5,467,971 A | 11/1995 | Hurtubise et al. | |
| 5,470,049 A | 11/1995 | Wohler et al. | |
| 6,079,700 A | 6/2000 | Solomond et al. | |
| 6,158,726 A | 12/2000 | Coleman et al. | |
| 6,296,237 B1 | 10/2001 | Nagai | |
| 6,352,250 B1 | 3/2002 | Tsuruta et al. | |
| 6,368,702 B1 | 4/2002 | Erickson | |
| 6,457,704 B1 | 10/2002 | Van Eerden et al. | |
| 6,517,501 B1 | 2/2003 | Slautterback | |
| 6,540,216 B2 * | 4/2003 | Tousi et al. | 267/140.3 |
| 6,592,112 B2 | 7/2003 | Bishop et al. | |
| 6,857,626 B2 | 2/2005 | Burlage et al. | |
| 6,872,758 B2 | 3/2005 | Simpson et al. | |
| 7,040,608 B2 | 5/2006 | Schafer | |
| 2002/0063369 A1 | 5/2002 | Huang | |
| 2003/0222386 A1 | 12/2003 | Duerre et al. | |
| 2004/0075204 A1 | 4/2004 | Heidemann et al. | |
| 2004/0094880 A1 | 5/2004 | Lee | |
| 2005/0012256 A1 | 1/2005 | Huprikar et al. | |
| 2006/0001205 A1 * | 1/2006 | Raza | 267/152 |

FOREIGN PATENT DOCUMENTS

| | | |
|---|---|---|
| JP | 61085430 A | 5/1986 |
| JP | 06189392 A | 7/1994 |
| JP | 2001036997 A | 2/2001 |
| WO | WO 88/05801 | 8/1988 |

OTHER PUBLICATIONS

U.S. Appl. No. 11/779,076, filed Jul. 17, 2007, Dickson et al., 31 pages.

* cited by examiner

METHOD OF DEFORMING A MICROCELLULAR POLYURETHANE COMPONENT

BACKGROUND OF THE INVENTION

1. Field of the Invention

The present invention relates to a method of deforming a microcellular polyurethane component which can be utilized as a coil spring isolator or a jounce bumper.

2. Description of the Related Art

Methods of forming components from microcellular polyurethane (MCU) are known in the art. A component made of MCU is formed by mixing and injecting a liquid reaction mixture into a reaction mold. The liquid reaction mixture reacts and solidifies such that the component is in a partially cured state, i.e. a gelled state. In the partially cured state, the MCU has the physical property of being solid and the chemical bonds of the MCU are not completely formed. The component is then heated to cure the MCU, i.e. to complete the formation of the chemical bonds. The curing of the MCU makes the component more durable.

When the liquid reaction mixture reacts and solidifies, the component is formed in the shape of the reaction mold. The reaction mold is sized and shaped such that the component is formed in a desired size and shape. Difficulties arise with the current methods of forming MCU components when the component is thin, specifically when the component is less than 8 mm thick. Difficulties also arise when the component has a complex shape, such as sharp angles. Specifically, the reaction mixture is viscous and does not easily flow into and fill thin and complexly shaped reaction molds.

When the liquid reaction mixture reacts and solidifies, the component has a uniform density. Backings or skeletons having a density greater than or less than the density of the MCU are attached to the MCU such that the component has varying density. However, current methods of forming components from MCU are not conducive to forming one-piece components of common homogeneous MCU having varying density.

It is known in the prior art to thermoform components of certain materials to increase the density of the component and to shape the component. Specifically, components made of thermoplastic material are more conducive to thermoforming in comparison to components made of thermosetting material. Thermoplastic material is defined by molecules that do not chemically bond with each other when heated. Consequently, thermoplastic material can be repeatedly softened by heating and hardened by cooling. Thermoplastic materials melt without degrading because the melt temperature is lower than the chemical degradation temperature. In contrast, thermosetting material is defined by molecules that chemically bond with each other when heated. Thermosetting materials cannot melt without degrading because the melt temperature is higher than the chemical degradation temperature. Molecules of thermosetting material cross-link with each other to create a permanent three-dimensional molecular network.

Thermoforming includes the steps of heating the component and compressing the component such that the component is shaped and is increased in density. For example, U.S. Pat. No. 6,368,702 to Erickson (the '702 patent) discloses a method of thermoforming a component formed from thermoplastic material. The '702 patent discloses heating a thermoplastic foam sheet and compressing the thermoplastic foam sheet to deform the component to define a thin, highly compressed portion and a thick, non-compressed portion. The '702 patent does not disclose a method of deforming a component formed of thermosetting material, such as MCU, to shape the component and to increase the density of a first portion of the component relative to a second portion of the component.

Accordingly, it would be desirable to identify a method of deforming a component formed of materials other than thermoplastic materials into thin and/or complex shapes. Additionally, it is desirable to identify a method of deforming a component formed of materials other than thermoplastic materials such that the component has varying density.

SUMMARY OF THE INVENTION AND ADVANTAGES

The present invention is a method of deforming a component comprising the steps of forming the component from thermosetting, elastomeric microcellular polyurethane (MCU). The method further includes the step of heating at least a portion of the component to a first temperature. The method further includes the step of compressing the first portion of the component while maintaining the first portion of the component at the first temperature and while maintaining the second portion of the component at an undeformable state to shape the first portion of the component and to permanently increase a density of the first portion of the component relative to a density of the second portion of the component.

Accordingly, the method of the present invention deforms the component formed from MCU to shape the first portion of the component into a relatively thin and/or relatively complex shape. In addition, the method of the present invention deforms the component formed from MCU to increase the density of the first portion of the component relative to the second portion of the component. For example, the method of deforming the component formed from MCU enables strategic densification of the first portion of the component. In other words, the densification is manageable as design of the component requires.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate like or corresponding parts throughout the several views, a component 20, 120 made of microcellular polyurethane (MCU) is shown. The component 20, 120 is preferably of the type disclosed in the United States Patent Application titled "One-Piece Microcellular Polyurethane Component Having Different Densities" filed by Dickson on the same day as the present application. However, it should be appreciated that the component 20, 120 may be any type of component 20, 120.

For example, the MCU is of the type manufactured by BASF Corporation under the tradename Cellasto®. The MCU is a thermosetting material. In other words, once the MCU is formed and cured, the MCU is not meltable without permanently altering the chemical bonds and the physical properties of the MCU. Specifically, thermosetting material is defined by molecules that chemically bond with each other when heated. Thermosetting materials cannot melt without degrading because the melt temperature is higher than the chemical degradation temperature. More specifically, molecules of the thermosetting material cross-link with each other to create a permanent three-dimensional molecular network.

The present invention is a method of deforming the component 20, 120 to shape a first portion 22, 122 of the component 20, 120 and to permanently increase the density of the first portion 22, 122 of the component 20, 120 relative to a second portion 24, 124 of the component 20, 120. It should be appreciated that the first portion 22, 122 is not limited to one continuous portion, but may include multiple discrete portions. The method of deforming the component 20, 120 formed from MCU enables strategic densification of the first portion 22, 122 of the component 20, 120 and the densification is manageable as design of the component 20, 120 requires.

Figure 3:
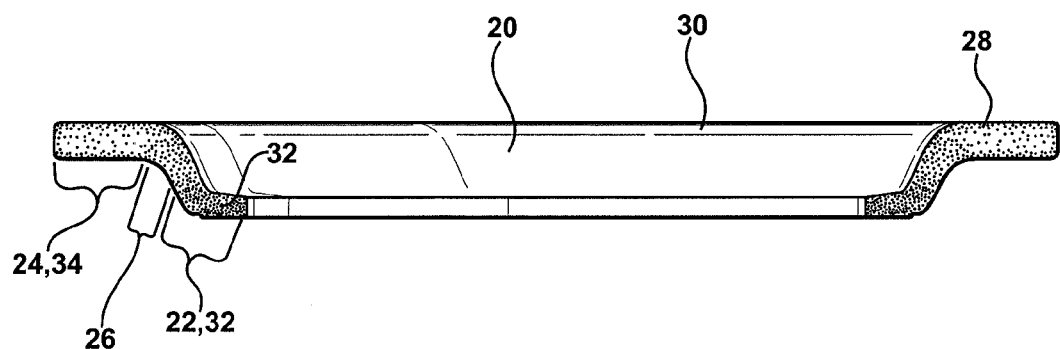
FIG. 3 is a cross-sectional view of the coil spring isolator taken along line 3-3 of FIG. 1 after the coil spring isolator has been deformed.
Figure 6:
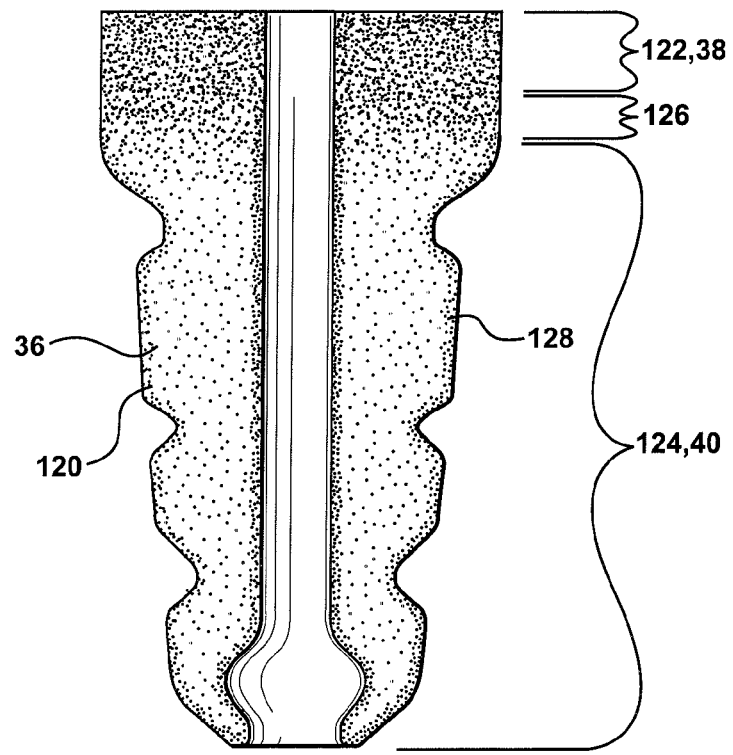
FIG. 6 is a cross-sectional view of the jounce bumper through line 6-6 of FIG. 4 after the jounce bumper has been deformed.

As shown in FIGS. 3 and 6, after deformation, the first portion 22, 122 of the component 20, 120 defines a first density and the second portion 24, 124 of the component 20, 120 defines a second density less than the first density. A third portion 26, 126 of the component 20, 120 is integral with and extends between the first portion 22, 122 and the second portion 24, 124. The density of the third portion 26, 126 transitions between the first density of the first portion 22, 122 and the second density of the second portion 24, 124.

Preferably, the component 20, 120 presents a skin of increased density 28, 128 continuous with and surrounding the first portion 22, 122, the second portion 24, 124, and the third portion 26, 126. It should be appreciated that prior to deformation, the component 20, 120 has uniform density throughout the component 20, 120 other than the skin of increased density 28, 128. Alternatively, prior to deformation, component 20, 120 has varying density throughout the component 20, 120 in addition to the skin of increased density 28, 128.

Figure 1:
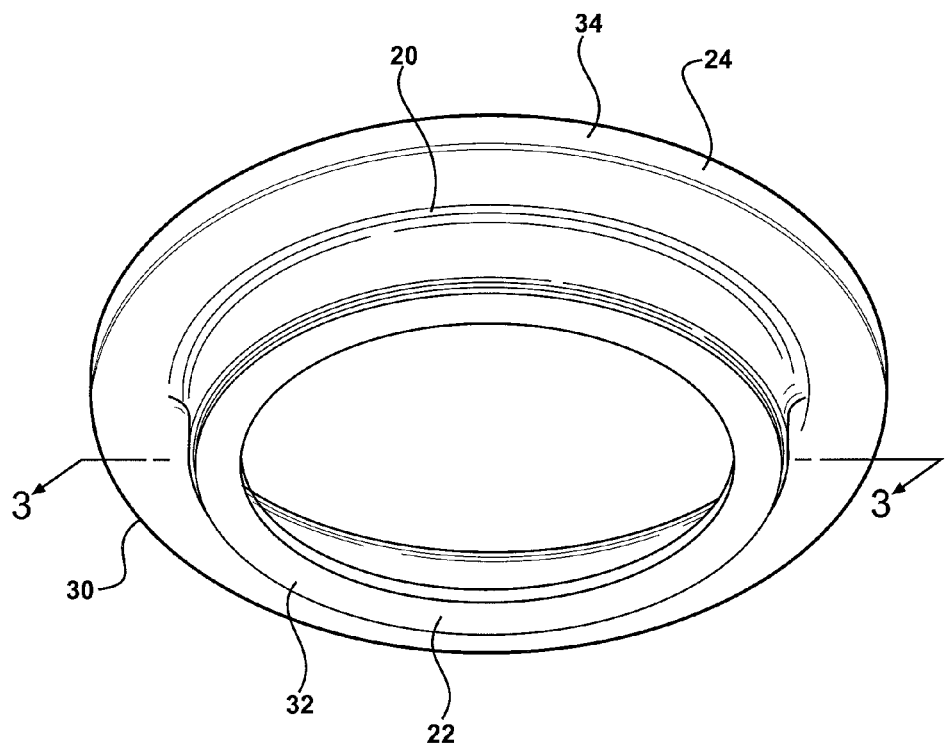
FIG. 1 is a perspective view of the component in the form of a coil spring isolator.
Figure 2:
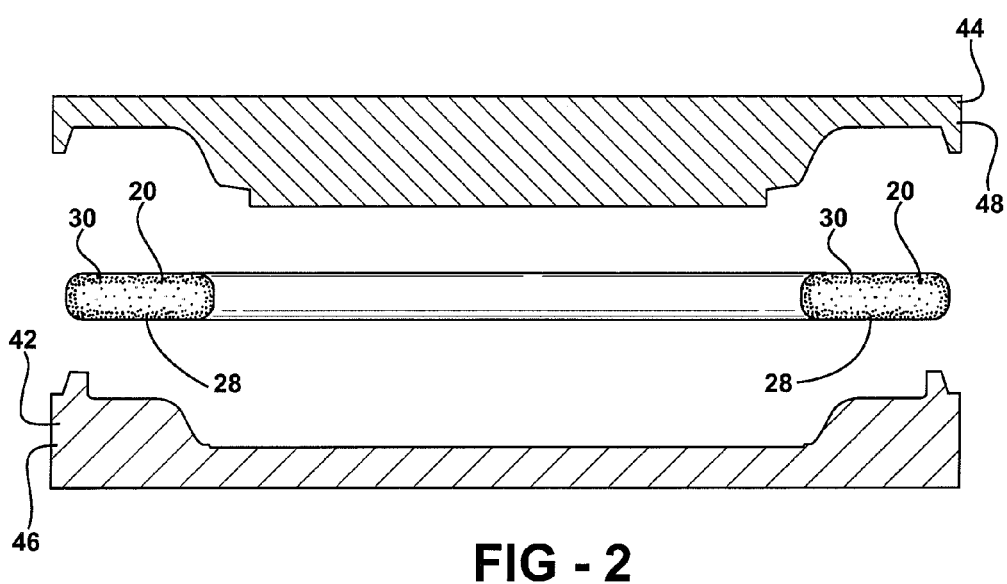
FIG. 2 is a cross-sectional view of the coil spring isolator disposed between a first isolator mold half and a second isolator mold half before the coil spring isolator is deformed.
Figure 5:
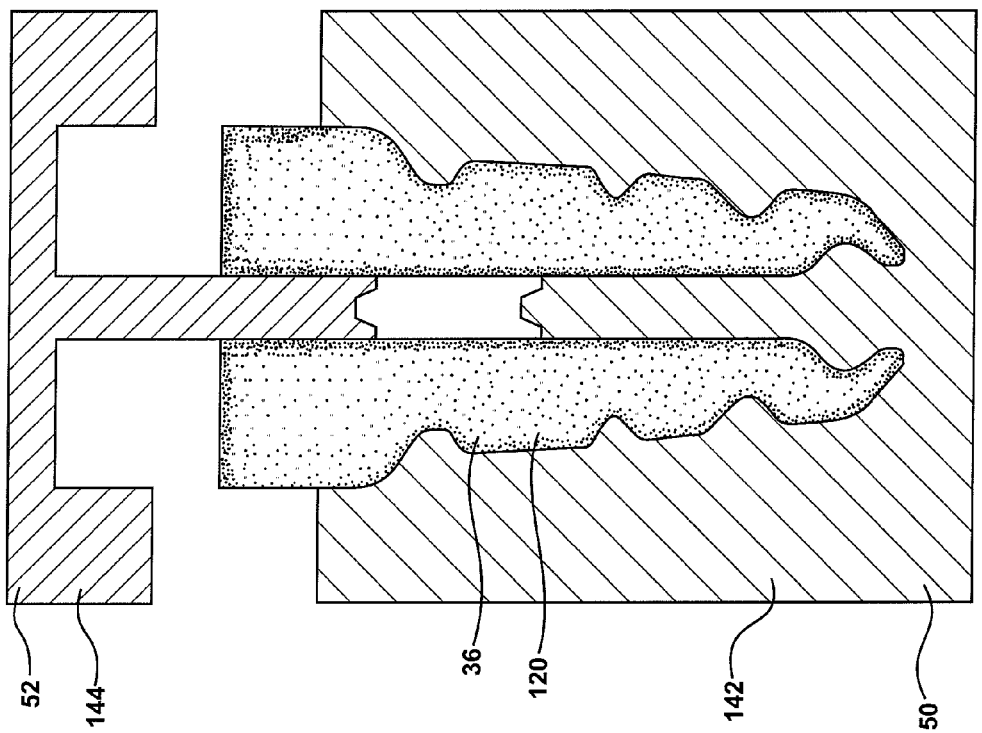
FIG. 5 is a cross-sectional view of the jounce bumper disposed between a first bumper mold half and a second bumper mold half before the jounce bumper is deformed.
Figure 4:
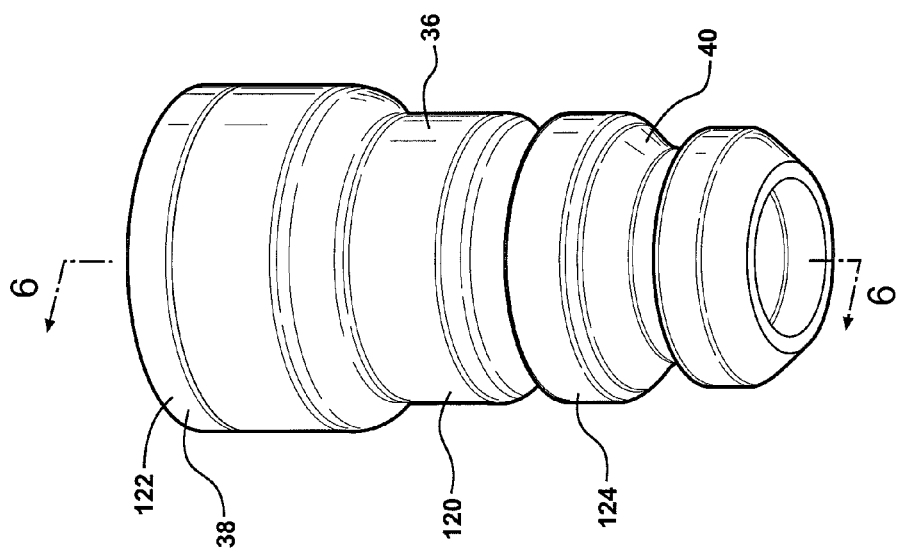
FIG. 4 is a perspective view of a component in the form of a jounce bumper.

As will be discussed below and as shown in FIGS. 1-3, in a first embodiment of the method, the component 20 is further defined as a coil spring isolator 30 with the first portion 22 defining a lip 32 and the second portion 24 defining a rim 34. As shown in FIGS. 4-6, in a second embodiment of the method the component 120 is further defined as a jounce bumper 36 with the first portion 122 defining a shoulder 38 and the second portion 124 defining a projection 40. It should be appreciated the first and second embodiments are exemplary and the method is not limited to such embodiments.

Although the invention is illustrated in different configurations in the first and second embodiments, each of the embodiments includes common features. The features common to each of the embodiments will be discussed prior to the discussion of each embodiment. To enhance consistency, the reference numerals of the common features of the first embodiment have been increased by 100 in the second embodiment.

As known to one skilled in the art, MCU has a microcellular structure. In other words, the MCU presents cell walls defining cells, or void space. When not subject to compressive forces, the cell walls have an original shape and the cells are generally filled with air. Generally, when the component 20, 120 made of MCU is subjected to compressive forces, the cell walls are collapsed and air evacuates from the cells and the component 20, 120 is thereby deformed. When the compressive forces are removed from the component 20, 120, the cell walls return to the original shape and the component 20, 120 thereby regains its form. The method of the present invention permanently deforms, or collapses, the cell walls of the MCU of the first portion 22, 122 of the component 20, 120 thereby permanently shaping the first portion 22, 122 and permanently increasing the first density the first portion 22, 122 relative to the second density of the second portion 24, 124 of the component 20, 120. As referred to herein, the density of the component 20 is the weight of the component 20 divided by the volume of the component 20, 120. In other words, it should be appreciated that the density of the chemical, i.e., the MCU, is not being altered, but instead the density of the component 20, 120 is being altered.

Preferably the component 20, 120 is deformed between a first mold half 42, 142 and a second mold half 44, 144. Specifically, as shown in FIG. 2, the first embodiment of the method includes a first isolator mold half 46 and a second isolator mold half 48 for deforming the coil spring isolator 30. As shown in FIG. 5, the second embodiment of the method includes a first bumper mold half 50 and a second bumper mold half 52 for deforming the jounce bumper 36.

The method includes the step of forming the component 20, 120 from MCU. Preferably, the step of forming the component 20, 120 is further defined as forming the component 20, 120 made of MCU from a liquid reaction mixture to a partially cured state before all chemical reactions of the MCU are complete. In other words, the component 20, 120 is formed in a partially cured state such that the component 20, 120 is deformed while the MCU is in the partially cured state. The partially cured state is also known in the art as a gelled state. Alternatively, the component 20 is deformed while the MCU is in the fully cured state.

More specifically, as known to one skilled in the art, generally the component 20, 120 made of MCU is formed by mixing and injecting the liquid reaction mixture into a reaction mold. The liquid reaction mixture reacts and solidifies such that the component 20, 120 is in the partially cured state. In the partially cured state, the MCU has the physical property of being solid and the bonds in the MCU are not completely formed. In the fully cured state, the bonds of the MCU are completely formed. Generally, heating the component 20, 120 accelerates the complete formation of the bonds. In other words, the component 20, 120 may be heated to cure the MCU.

The thermosetting, elastomeric MCU is formed from a two-step process. In the first step of the process, an isocyanate prepolymer is formed by reacting a polyol and an isocyanate. The polyol is polyester, and alternatively is polyether. The isocyanate is monomeric methyldiphenyl diisocyanate, and alternatively is naphthalene diisocyanate. In the second step of the process, the isocyanate prepolymer reacts with water to generate carbon dioxide and the carbon dioxide forms the cells of the MCU.

For example, polyester polyols are produced from the reaction of a dicarboxylic acid and a glycol having at least one primary hydroxyl group. For example, dicarboxylic acids that are suitable for producing the polyester polyols are selected from the group of, but are not limited to, adipic acid, methyl adipic acid, succinic acid, suberic acid, sebacic acid, oxalic acid, glutaric acid, pimelic acid, azelaic acid, phthalic acid, terephthalic acid, isophthalic acid, and combinations thereof. For example, glycols that are suitable for producing the polyester polyols are selected from the group of, but are not limited to, ethylene glycol, butylene glycol, hexanediol, bis (hydroxymethylcyclohexane), 1,4-butanediol, diethylene glycol, 2,2-dimethyl propylene glycol, 1,3-propylene glycol, and combinations thereof. The polyester polyol has a hydroxyl number of from 30 to 130, a nominal functionality of from 1.9 to 2.3, and a nominal molecular weight of from 1000 to 3000. Specific examples of polyester polyols suitable for the subject invention include Pluracol® Series commercially available from BASF Corporation of Florham Park, N.J.

For example, polyether polyols are produced from the cyclic ether propylene oxide, and alternatively ethylene oxide or tetrahydrofuran. Propylene oxide is added to an initiator in the presence of a catalyst to produce the polyester polyol. Polyether polyols are selected from the group of, but are not limited to, polytetramethylene glycol, polyethylene glycol, polypropylene glycol, and combinations thereof. The polyether polyol has a hydroxyl number, of from 30 to 130, a nominal functionality of from 1.9 to 2.3, and a nominal molecular weight of from 1000 to 5000. Specific examples of polyether polyols suitable for the subject invention include Pluracol® 858, Pluracol® 538, Pluracol® 220, Pluracol® TP Series, Pluracol® GP Series, and Pluracol® P Series commercially available from BASF Corporation of Florham Park, N.J.

For example, diisocyanates are selected from the group of, but are not limited to, 4,4'-diphenylmethane diisocyanate, 2,4'-diphenylmethane diisocyanate, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate, and combinations thereof. Specific examples of diisocyanates suitable for the subject invention include Lupranate® 5143, Lupranate® MM103, and Lupranate® R2500U commercially available from BASF Corporation of Florham Park, N.J.

The monomeric methyldiphenyl diisocyanate is selected from the group of 4,4'-diphenylmethane diisocyanate, 2,4'-diphenylmethane diisocyanate, and combinations thereof. Specific examples of monomeric methyldiphenyl diisocyanates suitable for the subject invention include Lupranate® M and Lupranate® MS commercially available from BASF Corporation of Florham Park, N.J. The monomeric methyldiphenyl diisocyante may also be modified with carbonimide. Specific examples of carbonimide-modified monomeric methyldiphenyl diisocyante include Lupranate® 5143 and Lupranate® MM103 commercially available from BASF Corporation of Florham Park, N.J.

Preferably the step of forming the component 20, 120 is further defined as forming the component 20, 120 made of MCU having a pie-deformation density between 300 Kg/m$^3$ and 700 Kg m$^3$. However, it should be appreciated that the method of the present invention may include MCU of any pre-deformation density.

The method further includes the step of heating at least a first portion 22, 122 of the component 20, 120 to a first temperature. Preferably, the step of heating the component 20, 120 to the first temperature is further defined as heating the component 20, 120 to between 145° C. and 235° C., and more preferably to between 175° C. and 205° C. The step of heating the component 20, 120 causes the cell walls of the MCU to become impressionable such that the cell walls of the MCU may be permanently deformed.

The method further includes the step of compressing the first portion 22, 122 of the component 20, 120 while maintaining the first portion 22, 122 of the component 20, 120 at the first temperature and while maintaining the second portion 24, 124 of the component 20, 120 at an undeformable state to shape the first portion 22, 122 of the component 20, 120 and to permanently increase the first density of the first portion 22, 122 of the component 20, 120 relative to the second density of the second portion 24, 124 of the component 20, 120. Preferably, the step of compressing the first portion 22, 122 of the component 20, 120 is further defined as permanently increasing the density of the first portion 22, 122 of the component 20, 120 to between 450 Kg/m$^3$ and 1050 Kg/m$^3$.

The step of compressing the first portion 22, 122 of the component 20, 120 is further defined as permanently collapsing the cell walls of the MCU of the first portion 22, 122. Specifically, because the first portion 22, 122 of the component 20, 120 is at the first temperature, the cell walls of the MCU are impressionable so that when the first portion 22, 122 of the component 20, 120 is compressed, the cell walls of the MCU are permanently deformed.

Preferably, the step of compressing the first portion 22, 122 of the component 20, 120 is further defined as shaping the first portion 22, 122 of the component 20, 120 to decrease the thickness of the first portion 22, 122 of the component 20, 120. As known to one skilled in the art, it is difficult and often impossible to use current methods of forming MCU to form components 20, 120 that are relatively thin and/or complexly shaped. The method of the present invention solves this problem by forming the component 20, 120 in a shape and thickness that is easily formed using current methods and subsequently deforming the component 20, 120 to shape the component 20, 120 such that the component 20, 120 is relatively thin and/or complexly shaped.

The step of compressing the component 20, 120 while maintaining the second portion 24, 124 of the component 20, 120 in the undeformable state is further defined as compressing the second portion 24, 124 of the component 20, 120 while the second portion 24, 124 of the component 20, 120 is at a second temperature less than the first temperature. More specifically, the second temperature is less than the first temperature such that the cell walls of the MCU are not impressionable. For example, the direction of the compressive forces to compress the first portion 22, 122 may intersect the second portion 24, 124 thereby compressing the second portion 24, 124. Because the second portion 24, 124 of the component 20, 120 is at the second temperature less than the first temperature, the cell walls of the MCU are not impressionable and when the compressive force is released, the cell walls regain the original shape.

In addition, or in the alternative, the step of compressing the component 20 while maintaining the second portion 24, 124 of the component 20, 120 in the undeformable state is further defined as compressing the first portion 22, 122 of the component 20, 120 while maintaining the second portion 24, 124 of the component 20, 120 in an uncompressed state. For example, if the second portion 24, 124 of the component 20, 120 is heated to the first temperature, then the cell walls of the MCU of the second portion 24, 124 become impressionable. When the cell walls of the MCU of the second portion 24, 124 are impressionable, the second portion 24, 124 is maintained in an uncompressed state and the first portion 22, 122 is compressed to shape the first portion 22, 122 and to permanently increase the first density of the first portion 22, 122 relative to the second density of the second portion 24, 124.

The step of compressing the component 20, 120 is further defined as compressing the third portion 26, 126 of the component 20, 120 integral with and extending between the first portion 22, 122 of the component 20, 120 and the second portion 24, 124 of the component 20, 120 to transition the first density of the first portion 22, 122 to the second density of the second portion 24, 124. Specifically, when the direction of the compressive forces to compress the first portion 22, 122 intersect the second portion 24, 124, the third portion 26, 126 being integral with and extending between the first portion 22, 122 and the second portion 24, 124 is also compressed.

The method further includes the step of curing the MCU from the partially cured state to a fully cured state after the first portion 22, 122 of the component 20, 120 is compressed. Preferably, the step of curing the MCU is further defined as heating the component 20, 120 to between 105° C. and 115° C. for between 14 hours and 18 hours to complete the chemical reactions of the MCU. As previously discussed, in the partially cured state the chemical bonds in the MCU are not completely formed. Heating the MCU in the partially cured state accelerates the complete formation of the chemical bonds.

Referring to FIGS. 1-3, in the first embodiment the step of compressing the first portion 22 of the component 20 is further defined as compressing the lip 32 of the coil spring isolator 30.

Specifically, as shown in FIG. 2, the method further includes the step of disposing the coil spring isolator 30 onto the first isolator mold half 46. The step of compressing the first portion 22 of the component 20 is further defined as exerting pressure on the lip 32 of the coil spring isolator 30 between the first isolator mold half 46 and the second isolator mold half 48, Preferably, the step of compressing the first portion 22 of the component 20 is further defined as exerting pressure on the lip 32 of the coil spring isolator 30 between the first isolator mold half 46 and the second isolator mold half 48 for between 30 and 180 seconds. The lip 32 of the coil spring isolator 30 is compressed while the coil spring isolator 30 is at the first temperature to permanently shape the lip 32 and to permanently increase the density of the lip 32 relative to the rim 34. It should be appreciated that the coil spring isolator 30 shown in FIG. 2 has not yet been deformed by the method of the present invention and the coil spring isolator 30 has a uniform density and is shaped differently than after deformation.

In the first embodiment of the method, the step of heating the component 20 is further defined as heating the first isolator mold half 46 and the second isolator mold half 48 while the coil spring isolator 30 is disposed between the first isolator mold half 46 and the second isolator mold half 48. Preferably, the step of heating the first isolator mold half 46 and the second isolator mold half 48 is further defined as heating the first isolator mold half 46 and the second isolator mold half 48 to between 175° C. and 260° C., and more preferably to between 205° C. and 235° C. Heat is conductively transferred from the first isolator mold half 46 and the second isolator mold half 48 to the coil spring isolator 30 when the coil spring isolator 30 is disposed between the first isolator mold half 46 and the second isolator mold half 48 and while the first isolator mold half 46 and the second isolator mold half 48 are heated. The conductive heat transfer increases the temperature of the component 20 to the first temperature such that the cell walls of the MCU are impressionable.

Alternatively or in addition to conductively heating with the first isolator mold half 46 and the second isolator mold half 48, the coil spring isolator 30 may be heated prior to the disposition of the coil spring isolator 30 onto the first isolator mold half 46. For example, the coil spring isolator 30 may be heated with infrared heat, microwave heat, or by convection prior to disposition of the coil spring isolator 30 onto the first isolator mold half 46. When heated prior to disposition of the coil spring isolator 30 onto the first isolator mold half 46, the coil spring isolator 30 is heated to the first temperature such that heat transfer from the first isolator mold half 46 and the second isolator mold half 48 maintains the coil spring isolator 30 at the first temperature. Alternatively, the coil spring isolator 30 is heated to a temperature below the first temperature such that less heat transfer is required from the first isolator mold half 46 and the second isolator mold half 48 to raise the temperature of the coil spring isolator 30 to the first temperature.

The method of the present invention is advantageously applied to the coil spring isolator 30 due to the relative thinness and the relatively complex shape of the coil spring isolator 30. Difficulties arise with the current methods of forming MCU components 20 when the component 20 is thin, specifically when the component 20 is less than 8 mm thick. Difficulties also arise when the component 20 defines sharp angles. As shown in FIGS. 1 and 3, the coil spring isolator 30 is relatively thin and the lip 32 and the rim 34 are sharply angled relative to one another. The method of the present invention solves this problem by forming the component 20 in a shape that is easily formed using current methods and subsequently deforming the component 20 to shape the component 20. Specifically, as shown in FIG. 2, the component 20 is cylindrical and does not define sharp angles so that the component 20 is easily formed using current methods. Applying the method of the present invention, the component 20 is decreased in thickness and shaped to include the lip 32 and the rim 34 sharply angled relative to one another.

Referring to FIGS. 4-6, in the second embodiment the step of compressing the first portion 22 of the component 20 is further defined as compressing the shoulder 38 of the jounce bumper 36.

Specifically, as shown in FIG. 5, the method further includes the step of disposing the jounce bumper 36 onto the first bumper mold half 50. The step of compressing the first portion 22 of the component 20 is further defined as exerting pressure on the shoulder 38 of the jounce bumper 36 with the second bumper mold half 52. Preferably, the step of exerting pressure on the shoulder 38 is further defined as exerting pressure on the shoulder 38 for between 30 and 180 seconds. It should be appreciated that the jounce bumper 36 shown in FIG. 5 has not yet been deformed by the method of the present invention and the jounce bumper 36 has a uniform density and the shoulder 38 is tall relative to the shoulder 38 after deformation.

In the second embodiment of the method, the step of heating the component 20 is further defined as heating the jounce bumper 36 prior to the disposition of the jounce bumper 36 into the first bumper mold half 50. Preferably, the step of heating the component 20 is further defined as heating the jounce bumper 36 with infrared heat prior to the disposition of the jounce bumper 36 into the first bumper mold half 50. Alternatively, the jounce bumper 36 may be heated with microwave heat or by convection.

In the second embodiment of the method, preferably the step of heating the component 120 is further defined as heating the second bumper mold half 52 to between 175° C. and 260° C., and more preferably to between 205° C. and 235° C., while the jounce bumper 36 is disposed between the first bumper mold half 50 and the second bumper mold half 52. As shown in FIG. 5, the second bumper mold half 52 is closeable to contact and compress the first portion 122 of the component 120. The second bumper mold half 52 is heated such that heat is conductively transferred from the second bumper mold half 52 to the first portion 122 of the component 120 to heat the first portion 122 of the component 120 to the first temperature and/or to maintain the first portion 122 of the component 120 at the first temperature.

The method of the present invention is advantageously applied to the jounce bumper 36. The projection 40 absorbs and is compressed by loads exerted on the jounce bumper 36. As the load increases and the projection 40 is further compressed, the load is transmitted through the projection 40 to the shoulder 38. Because the shoulder 38 is less compressible than the projection 40, when a load is applied to the projection 40, the projection 40 compresses more than the shoulder 38 compresses.

Such a result is advantageous because the jounce bumper 36 has advantageous impact isolating characteristics. Specifically, because the projection 40 is more compressible than the shoulder 38, the projection 40 absorbs loads and dampens vibrations. Because the shoulder 38 is less compressible than the projection 40, the shoulder 38 provides an increased block height. The block height is the height of the jounce bumper 36 when the jounce bumper 36 is fully compressed, i.e. when the jounce bumper 36 can not be compressed further. In other words, due to the varying density of the jounce bumper 36, the jounce bumper 36 has the combination of favorable characteristics, specifically impact isolation as well as an increased block height. The jounce bumper 36 may be optimized for specific applications by varying the length of the jounce bumper 36, the first density of the shoulder 38, and the second density of the projection 40 such that the bumper has favorable impact isolating characteristics.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described

The invention claimed is:

1. A method of deforming a component comprising the steps of:
   forming the component from a liquid reaction mixture into a thermosetting, elastomeric microcellular polyurethane in a solid and partially cured state before all chemical reactions of the microcellular polyurethane are complete, the component extending along an axis and including a first portion and a second portion each disposed along the axis,
   heating at least a first portion of the component to a first temperature while the microcellular polyurethane is in the solid and partially cured state before all chemical reactions of the microcellular polyurethane are complete,
   compressing the first portion of the component in a direction along the axis while maintaining the first portion of the component at the first temperature and while maintaining the second portion of the component at an undeformable state to shape the first portion of the component and to permanently increase a density of the first portion of the component relative to a density of the second portion of the component and while the microcellular polyurethane is in the solid and partially cured state before all chemical reactions of the microcellular polyurethane are complete, and
   curing the microcellular polyurethane from the partially cured state to a fully cured state after the first portion of the component is compressed.

2. The method as set forth in claim 1 wherein the step of curing the microcellular polyurethane is further defined as heating the component to between 105° C. and 115° C. for between 14 hours and 18 hours to complete the chemical reactions of the microcellular polyurethane.

3. The method as set forth in claim 1 wherein the step of compressing the first portion of the component is further defined as permanently collapsing cell walls of the microcellular polyurethane of the first portion.

4. The method as set forth in claim 1 wherein the step of compressing the component while maintaining the second portion of the component in the undeformable state is further defined as compressing the component while the second portion of the component is at a second temperature less than the first temperature.

5. The method as set forth in claim 1 wherein the step of compressing the component while maintaining the second portion of the component in the undeformable state is further defined as compressing the first portion of the component while maintaining the second portion in an uncompressed state.

6. The method as set forth in claim 1 wherein the step of forming the component is further defined as forming the component made of microcellular polyurethane having a pre-deformation density between 300 $Kg/m^3$ and 700 $Kg/m^3$.

7. The method as set forth in claim 6 wherein the step of compressing the first portion of the component is further defined as permanently increasing the density of the first portion of the component to between 450 $Kg/m^3$ and 1050 $Kg/m^3$.

8. The method as set forth in claim 1 wherein the step of compressing the first portion of the component is further defined as shaping the first portion of the component to decrease the thickness of the first portion of the component.

9. The method as set forth in claim 1 wherein the thermosetting, elastomeric microcellular polyurethane is formed from reacting a polyol and an isocyanate, wherein the polyol is polyester and the isocyanate is monomeric methyldiphenyl diisocyanate.

10. The method as set forth in claim 1 wherein the step of heating the component to the first temperature is further defined as heating the component to between 145° C. and 235° C.

11. The method as set forth in claim 10 wherein the step of heating the component to the first temperature is further defined as heating the component to between 175° C. and 205° C.

12. The method as set forth in claim 1 wherein the step of compressing the component is further defined as compressing a third portion of the component integral with and extending between the first portion of the component and the second portion of the component to transition the density of the first portion to the density of the second portion.

13. The method as set forth in claim 1 wherein the component is further defined as a jounce bumper with the first portion defining a shoulder and the second portion defining a projection, and wherein the step of compressing the first portion of the component is further defined as compressing the shoulder of the jounce bumper.

14. The method as set forth in claim 13 further including a first bumper mold half and a second bumper mold half and further including the step of disposing the jounce bumper onto the first bumper mold half.

15. The method as set forth in claim 14 wherein the step of compressing the first portion of the component is further defined as exerting pressure on the shoulder of the jounce bumper with the second bumper mold half.

16. The method as set forth in claim 15 wherein the step of exerting pressure on the shoulder is further defined as exerting pressure on the shoulder for between 30 and 180 seconds.

17. The method as set forth in claim 16 wherein the step of heating the component is further defined as heating the jounce bumper prior to the disposition of the jounce bumper into the first bumper mold half.

18. The method as set forth in claim 17 wherein the step of heating the component is further defined as heating the jounce bumper with infrared heat.

19. The method as set forth in claim 14 wherein the step of heating the component is further defined as heating the second bumper mold half to between 175° C. and 260° C. while the jounce bumper is disposed between the first bumper mold half and the second bumper mold half.

20. The method as set forth in claim 19 wherein the step of heating component is further defined as heating the second bumper mold half to between 205° C. and 235° C. while the jounce bumper is disposed between the first bumper mold half and the second bumper mold half.

21. A method of deforming a component comprising the steps of:
forming the component from a liquid reaction mixture into a thermosetting, elastomeric microcellular polyurethane in a solid and partially cured state before all chemical reactions of the microcellular polyurethane are complete and having a pre-deformation density between 300 $Kg/m^3$ and 700 $Kg/m^3$, the component extending along an axis and including a first portion and a second portion each disposed along the axis,
heating at least a first portion of the component to a first temperature while the microcellular polyurethane is in the solid and partially cured state before all chemical reactions of the microcellular polyurethane are complete,
compressing the first portion of the component in a direction along the axis while maintaining the first portion of the component at the first temperature and while maintaining the second portion of the component at an undeformable state to permanently collapse cell walls of the microcellular polyurethane of the first portion to shape the first portion of the component and to permanently increase a density of the first portion of the component to between 450 $Kg/m^3$ and 1050 $Kg/m^3$ and while maintaining the second portion of the component at between 300 $Kg/m^3$ and 700 $Kg/m^3$, and
curing the microcellular polyurethane from the partially cured state to a fully cured state after the first portion of the component is compressed.

22. The method as set forth in claim 21 wherein the step of curing the microcellular polyurethane is further defined as heating the component to between 105° C. and 115° C. for between 14 hours and 18 hours to complete the chemical reactions of the microcellular polyurethane.

23. The method as set forth in claim 21 wherein the step of compressing the component while maintaining the second portion of the component in the undeformable state is further defined as compressing the component while the second portion of the component is at a second temperature less than the first temperature.

24. The method as set forth in claim 1 wherein the step of compressing the component while maintaining the second portion of the component in the undeformable state is further defined as compressing the first portion and the second portion while the second portion is at a second temperature less than the first temperature.

* * * * *